US009523351B2

(12) United States Patent
Shaw et al.

(10) Patent No.: US 9,523,351 B2
(45) Date of Patent: Dec. 20, 2016

(54) SYSTEM FOR PACKAGING ELECTRONIC COMPONENTS IN A ROTATABLE SHAFT

(71) Applicant: General Electric Company, Schenectady, NY (US)

(72) Inventors: Donald W. Shaw, Simpsonville, SC (US); Kurt Kramer Schleif, Greenville, SC (US); Zachary John Snider, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 145 days.

(21) Appl. No.: 14/541,196

(22) Filed: Nov. 14, 2014

(65) Prior Publication Data

US 2016/0138426 A1    May 19, 2016

(51) Int. Cl.
*H05K 5/00* (2006.01)
*F03D 7/04* (2006.01)
*F01D 21/00* (2006.01)

(52) U.S. Cl.
CPC ............. *F03D 7/042* (2013.01); *F01D 21/003* (2013.01); *F03D 80/82* (2016.05); *F05D 2220/31* (2013.01); *F05D 2220/32* (2013.01); *F05D 2240/60* (2013.01); *F05D 2260/80* (2013.01)

(58) Field of Classification Search
CPC ............ H05K 7/14; H05K 7/20; H05K 7/209; F01D 21/00; F01D 21/03; F01D 25/00; F01D 25/28

USPC ....... 361/709, 711, 719, 721, 736, 755, 759; 174/547

See application file for complete search history.

(56) References Cited

U.S. PATENT DOCUMENTS

| 5,408,894 A  * | 4/1995 | Henson .................... G01P 1/04 73/866.5 |
| 2004/0161950 A1 | 8/2004 | Coleman |
| 2013/0206532 A1* | 8/2013 | Achrekar .............. F16D 13/385 192/48.601 |

OTHER PUBLICATIONS

Co pending U.S. Appl. No. 14/541,203 dated Nov. 14, 2014.

* cited by examiner

*Primary Examiner* — Xiaoliang Chen
(74) *Attorney, Agent, or Firm* — Dority & Manning, PA

(57) ABSTRACT

A system for packaging electronic components in a rotatable shaft includes an annular carrier shaft having a first end that is axially spaced from a second end and an inner surface that is radially spaced from an outer surface, and a plurality of transmitter assemblies annularly arranged within the carrier shaft. Each transmitter assembly includes a transmitter housing radially supported within the carrier shaft via a pair of circumferentially spaced rail members. Each transmitter assembly comprises a daughter board that extends laterally and longitudinally across a bottom portion of the transmitter housing and at least one electronic component electrically coupled to the daughter board. The electronic component extends substantially perpendicular to the daughter board within the transmitter housing.

10 Claims, 7 Drawing Sheets

SYSTEM FOR PACKAGING ELECTRONIC COMPONENTS IN A ROTATABLE SHAFT

FIELD OF THE INVENTION

The present invention generally involves a turbomachine. More specifically, the present invention involves a system for packaging electronic components in a rotatable shaft coupled to a rotor shaft of the turbomachine.

BACKGROUND OF THE INVENTION

Turbomachines such as wind turbines, gas turbines, steam turbines, pumps, fans, generators, motors, and other forms of commercial equipment frequently include shafts, blades, and other rotating components. It is known in the art to install one or more sensors on the rotating components to measure various characteristics of those components in order to control, monitor, and/or enhance the operation of the rotating components. For example, sensors that measure temperature, velocity, stress, strain, vibrations, and/or other characteristics of the rotating components may allow for early detection of abnormalities, adjustments to repair or maintenance schedules, and/or other actions to enhance operations.

Various slip ring and telemetry systems exist in the art for transmitting the analogue sensor data from the rotating components to stator components for further analysis. Conventionally, analogue signals from the sensors are routed via wires to individual slip or contact rings positioned axially along a rotatable center bore or shaft portion of the slip ring assembly. Stationary contact arms or brushes then provide a signal path for routing the signals from the rotating contact or slip rings to a controller, data processor or the like.

In order to accommodate ever increasing data requirements for test and operation of the turbomachine, it is necessary to digitize and compress at least some of the analogue signals from the sensors prior to passing the signals on to the slip or contact rings. This requires various electronic components such as circuit boards to be mounted at one end of rotor shaft of the turbomachine. As the rotor shaft turns, the electronic components are exposed to g-loads that may affect the integrity of the electronic connections between the sensors, the electronic components and the slip or contact rings. In addition, the various electronic components generate a considerable amount of heat, thus potentially leading to thermal fatigue. Therefore, a system for packaging various electronic components such as slip ring electronics in a rotatable shaft that mitigates g-load effects on the various electronic components would be useful.

BRIEF DESCRIPTION OF THE INVENTION

Aspects and advantages of the invention are set forth below in the following description, may be obvious from the description, or may be learned through practice of the invention.

One embodiment of the present invention is a system for packaging electronic components in a rotatable shaft. The system includes an annular carrier shaft having a first end that is axially spaced from a second end and an inner surface that is radially spaced from an outer surface, and a plurality of transmitter assemblies annularly arranged within the carrier shaft. Each transmitter assembly includes a transmitter housing radially supported within the carrier shaft via a pair of circumferentially spaced rail members. Each transmitter assembly comprises a daughter board that extends laterally and longitudinally across a bottom portion of the transmitter housing and one or more electronic components coupled to the daughter board and at least partially sealed within the transmitter housing. The electronic component extends substantially perpendicular to the daughter board within the transmitter housing.

Another embodiment of the present invention is a turbomachine. The turbomachine having an annular rotor shaft and a plurality of sensors where each sensor is coupled to a rotatable component that is coupled to the rotor shaft. Each sensor is connected to a first end of a wire, wherein a second end of the wire terminates at a connector outside of the rotor shaft. An annular carrier shaft is coupled at a first end to an end portion of the rotor shaft. The carrier shaft includes a second end axially spaced from the first end and an inner surface that is radially spaced from an outer surface. The turbomachine further includes a plurality of transmitter assemblies annularly arranged within the carrier shaft. Each transmitter assembly includes a transmitter housing which is radially supported within the carrier shaft via a pair of circumferentially spaced rail members. Each transmitter assembly comprises a daughter board that extends laterally and longitudinally across a bottom portion of the transmitter housing and at least one electronic component electrically coupled to the daughter board. The electronic component extends substantially perpendicular to the daughter board within the transmitter housing.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations as come within the scope of the appended claims and their equivalents.

Although exemplary embodiments of the present invention will be described generally in the context of a gas turbine for purposes of illustration, one of ordinary skill in the art will readily appreciate that embodiments of the present invention may be applied to any turbomachine. For example, the invention may be applied to a steam turbine, a wind turbine, a fan or the like which includes electronics, such as analog to digital convertors connected to a rotating shaft and the specification is not intended to be limited to a gas turbine turbomachine unless otherwise specified in the claims.

Figure 1:
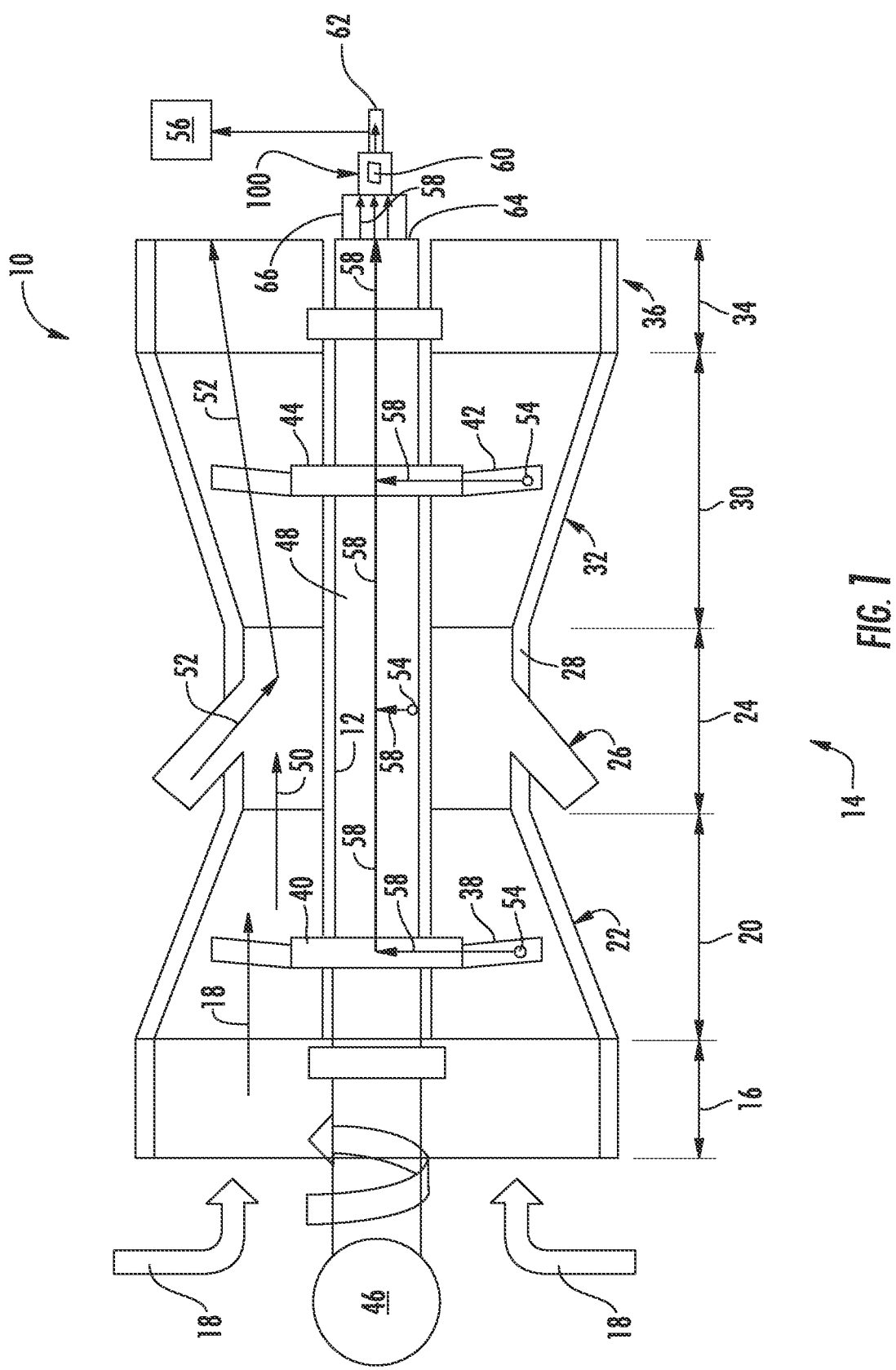
FIG. 1 is a functional block diagram of an exemplary turbomachine having a rotor shaft which extends along an axial centerline of the turbomachine as may be incorporated into various embodiments of the present invention.

Referring now to the drawings, wherein identical numerals indicate the same elements throughout the figures, FIG. 1 provides a functional block diagram of an exemplary turbomachine 10 having a rotor shaft 12 that extends along an axial centerline of the turbomachine 10. In particular embodiments, as shown in FIG. 1, the turbomachine 10 is a gas turbine 14. The gas turbine 14 generally includes an inlet section 16 that may include a series of filters, cooling coils, moisture separators, and/or other devices (not shown) to purify and otherwise condition air 18 entering the gas turbine 14. A compressor section 20 including a compressor 22 is disposed downstream from the inlet section 16. A combustion section 24 is disposed downstream from the compressor section 20 and may include a plurality of combustors 26 annularly arranged around an outer casing 28 such as a compressor discharge casing.

A turbine section 30 including a high and/or low-pressure turbine 32 is disposed downstream from the combustion section 24. The gas turbine 14 may also include an exhaust section 34 that includes an exhaust duct or diffuser 36. The exhaust section 34 may be disposed downstream from an outlet of the turbine 32. In particular configurations, the inlet section 16, compressor 22, the combustion section 24, turbine 32 and the exhaust duct 36 define a primary flow passage through the gas turbine 12.

The compressor 20 generally includes multiple rows or stages of compressor blades 38 (only one stage shown) where each row of compressor blades 38 is coupled to the rotor shaft 12 via a compressor rotor disk 40. In addition, the turbine 32 generally includes multiple rows or stages of turbine blades 42 (only one stage shown) where each row of the turbine blades 42 may be coupled to the rotor shaft 12 via a turbine rotor disk 44. The compressor and turbine blades 38, 42 are generally mounted, angled and/or formed such that rotation of the rotor shaft 12 causes the air 18 to flow through the inlet section 16 and into the compressor 22.

In particular embodiments, the rotor shaft 12 may be connected to a motor and/or a generator 46 in order to turn the rotor shaft 12 and/or to generate electrical power and/or mechanical work. The rotor shaft 12 may be a single shaft or may include multiple shafts coupled to form a singular shaft through the turbomachine 10 or gas turbine 14. In particular embodiments, the rotor shaft 12 is annularly shaped to form or define an inner passage 48 that extends axially therein.

In operation, air 18 is drawn through the inlet section 16 and into the compressor 22 where it is progressively compressed to provide compressed air 50 to the combustion section 24. The compressed air 50 flows to the combustors 26 where it is mixed with a fuel. The fuel-air mixture in each combustor 26 is burned, thus generating high temperature combustion gases 52 at a high velocity. The combustion gas 52 flows through the turbine 32 where thermal and kinetic energy are transferred from the combustion gas 52 to the turbine blades 42, thus causing the rotor shaft 12 to rotate. The combustion gas 52 is exhausted through the exhaust duct 36.

During operation of a turbomachine 10 such as the gas turbine 14 described herein, the various rotatable components such as the compressor blades 38, the compressor rotor disks 40, the turbine blades 42, the turbine rotor disks 44, the rotor shaft 12 and various other rotatable turbomachine components are exposed to potentially life limiting thermal and/or mechanical stresses. As a result, it is generally desirable to monitor various operating parameters such as temperature, velocity, stress, strain, vibrations, and/or other characteristics of the rotating components which may allow for early detection of abnormalities, allow for adjustments to repair or maintenance schedules, and/or other actions to enhance operation and/or efficiency of the turbomachine 10.

In order to monitor the various operating parameters at the various rotatable components, sensors 54 may be coupled to or disposed proximate to the various rotatable components within the turbomachine 10. The sensors 54 may comprise pressure detectors, strain gauges, or accelerometers that generate one or more signals reflective of vibrations or movement by the compressor blades 38, turbine blades 42, or other rotating components. In other embodiments, the sensors 54 may comprise thermocouples or resistance temperature detectors that generate one or more signals reflective of the temperature of the various rotating components. One of ordinary skill in the art will readily appreciate that embodiments of the present invention are not limited to any particular sensor unless specifically recited in the claims.

The sensors 54 may be placed on the compressor blades 38, compressor rotor disks 40, turbine blades 42, and turbine rotor disks 44, within the inner passage 48 of the rotor shaft 12 or on any rotatable component of the turbomachine. Signals are transmitted from the rotatable sensors 54 to a stationary data processor 56 such as a controller or computing device via wires 58 and a slip ring assembly. In particular embodiments, at least some of the sensors 54 are electronically coupled to various electronics 60 that may process, modify or otherwise manipulate the signals from the sensors 54. For example, the electronics 60 may include analog to digital convertors or the like to digitize the signals electronically upstream from a slip ring 62 and/or the stationary data processor 56. Therefore, in many cases it is necessary to mount the electronics 60 to and/or within the rotor shaft 12, thus subjecting the electronics 60 to potentially life limiting g-loads and thermal stresses.

Figure 2:
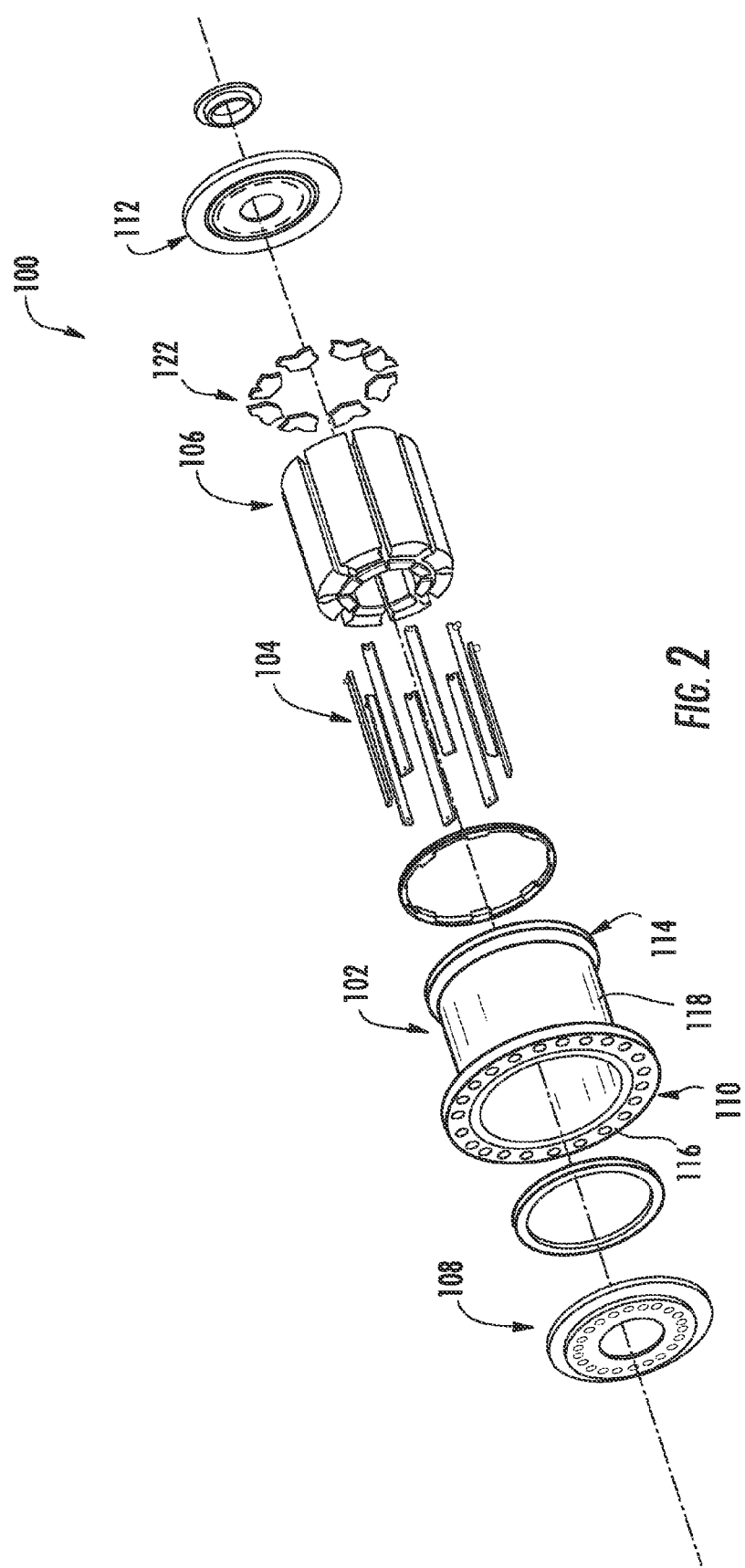
FIG. 2 is an exploded perspective view of a system for packaging electronic components in a rotatable shaft according to various embodiments of the present invention.

FIG. 2 provides an exploded perspective view of a system for packaging electronic components in a rotatable shaft 100, herein referred to as "system", according to various embodiments of the present invention. As shown in FIG. 1, the system 100 may be coupled to one end 64 of the rotor shaft 12. In particular embodiments, the system 100 may be coupled to the rotor shaft 12 via an extension shaft 66. The extension shaft 66 may provide a means for routing wires 58 from the rotor shaft 12 to the system 100 and/or for electronically coupling the wires 58 to the system 100, for example, via a plurality of connectors (not shown) coupled to terminating ends of the wires 58.

As shown in FIG. 2, the system 100 includes an annular carrier shaft 102, a plurality of rail members 104 and a plurality of transmitter assemblies 106 annularly arranged about an axial centerline of the system 100. In particular embodiments, the system 100 may further include a forward motherboard 108 that is disposed at and/or extends radially and circumferentially across a forward end 110 of the carrier shaft 102 and an aft motherboard 112 that is disposed at and/or extends radially and circumferentially across an aft end 114 of the carrier shaft 102.

Figure 3:
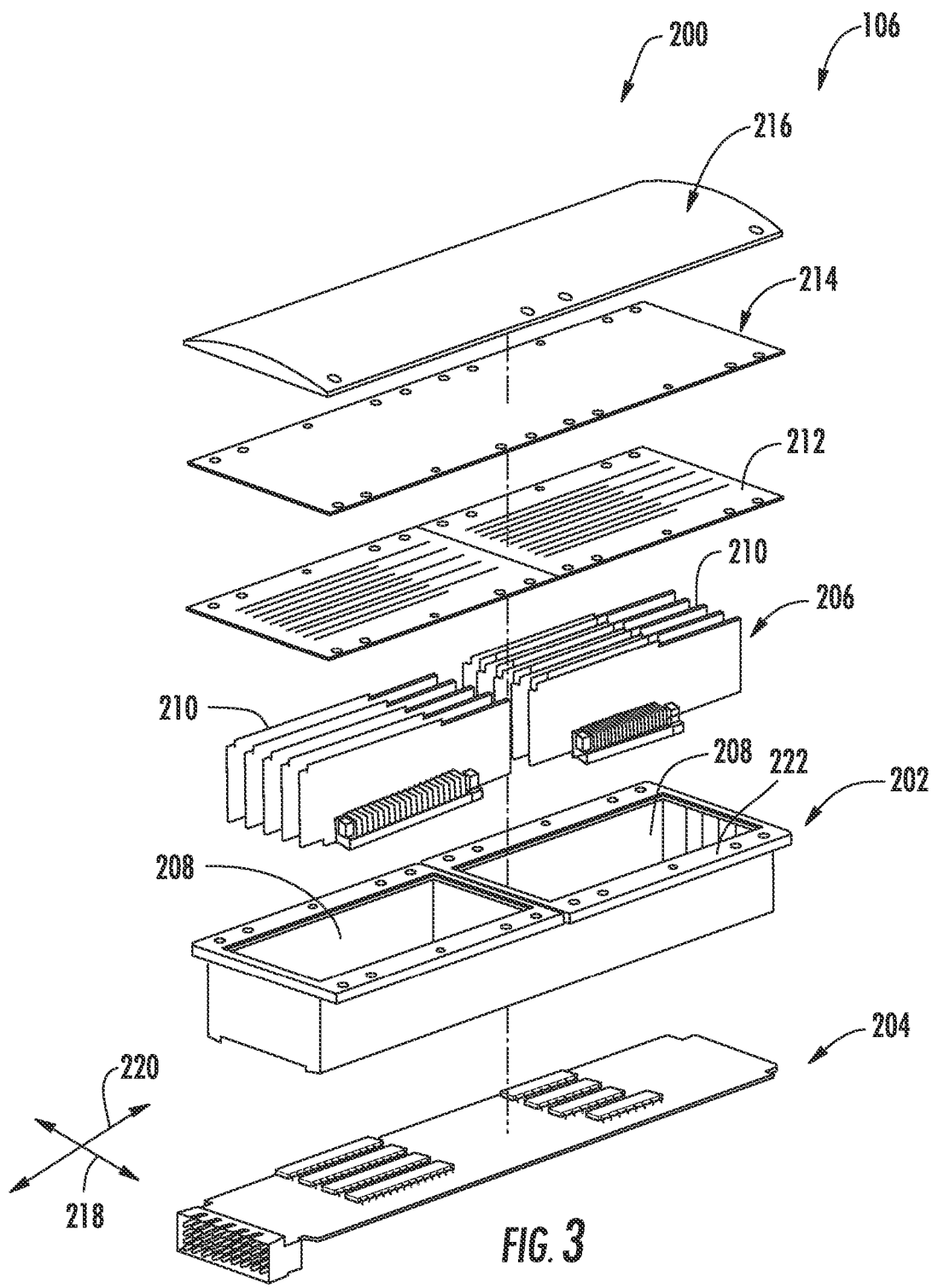
FIG. 3 is an exploded perspective view of an exemplary transmitter assembly according to various embodiments of the present invention.

FIG. 3 provides an exploded perspective view of an exemplary transmitter assembly 200 that is representative of at least one transmitter assembly 106 of the plurality of transmitter assemblies 106 according to various embodiments of the present invention. In particular embodiments, as shown in FIG. 3, the transmitter assembly 200 includes a transmitter housing 202, a circuit or daughter board 204 and at least one electronic component 206 vertically mounted within an inner pocket 208 formed within the transmitter housing 202. In one embodiment, the electronic component 206 comprises of a plurality of circuit boards 210.

In one embodiment, the transmitter assembly 200 includes a partitioning plate 212. In addition or in the alternative, the transmitter assembly 200 may include a shim 214. In various embodiments, the transmitter assembly 200 includes a lid 216. The lid 216 is formed to extend laterally or in a lateral direction 218 and longitudinally or in a longitudinal direction 220 across a top portion 222 of the transmitter housing 202. In one embodiment, the lid 216 at least partially seals the electronic components 206 such as the circuit boards 210 within the inner pocket 208.

Figure 4:
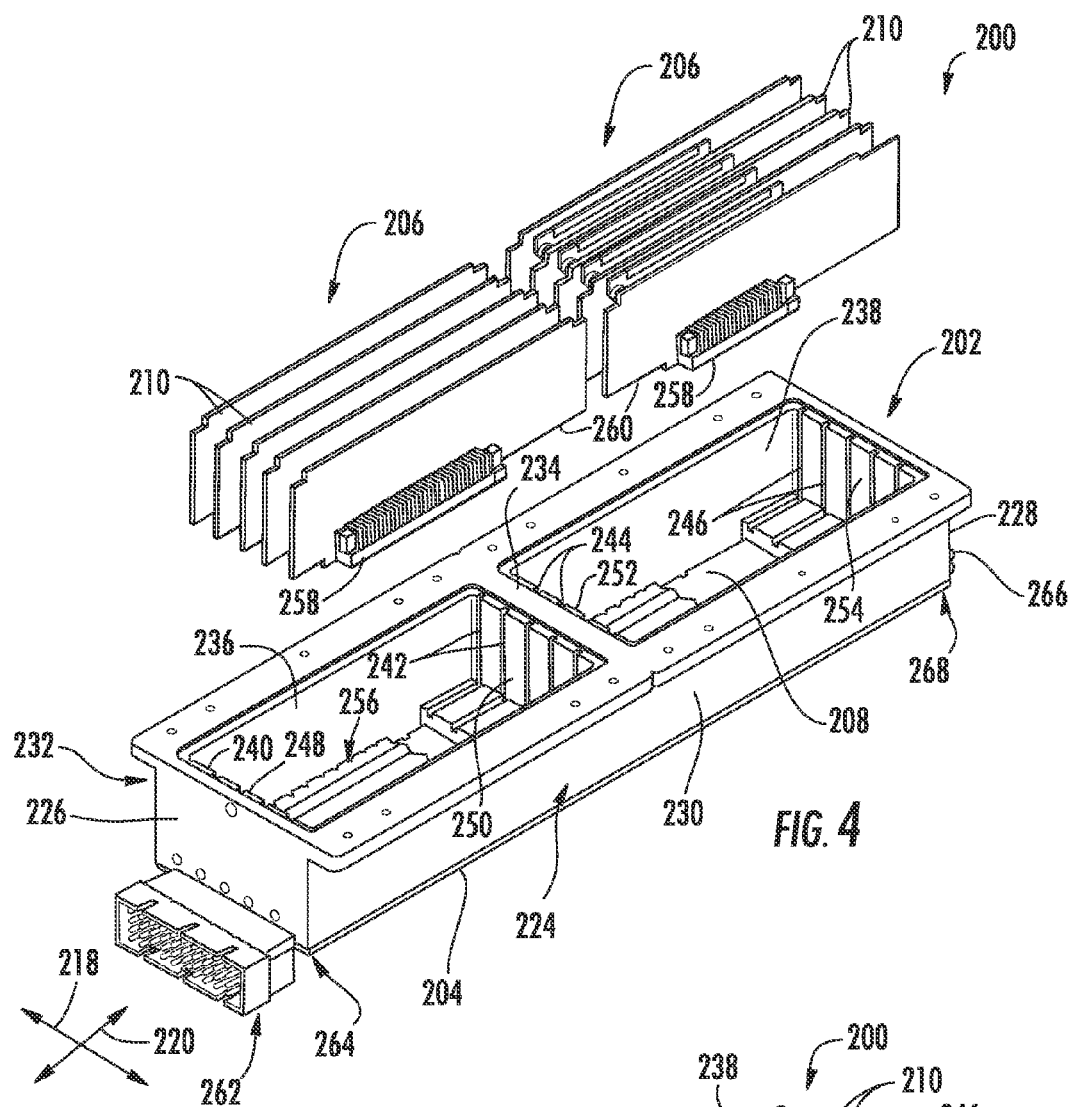
FIG. 4 is an exploded perspective view of a portion of the transmitter assembly as shown in FIG. 3, according to at least one embodiment of the present invention.

FIG. 4 provides an exploded perspective view of a portion of the transmitter assembly 200 as shown in FIG. 3, according to at least one embodiment of the present invention. As shown in FIG. 4, the daughter board 204 extends laterally 218 and in a longitudinally 220 across a bottom portion 224 of the transmitter housing 202. The daughter board 204 may be fixedly connected to the transmitter housing 202 via mechanical fasteners (not shown), epoxy, solder or by any means suitable for fixedly connecting the daughter board 204 to the transmitter housing 202.

In various embodiments, as shown in FIG. 4, the transmitter housing 202 includes a forward wall 226, an aft wall 228 and a pair of laterally opposing sidewalls 230, 232 that at least partially form the inner pocket 208 therein. In particular embodiments, the transmitter housing 202 may include an intermediate wall 234 that extends laterally between the opposing sidewalls 230, 232 within inner pocket 208. The intermediate wall 234 may at least partially define a first inner pocket 236 and a second inner pocket 238 within the transmitter housing 202. For example, the forward, intermediate and side walls 226, 234, 230, 232 may define the first inner pocket 236 and the intermediate, aft and side walls 234, 228, 230, 232 may define the second inner pocket 238 within the transmitter housing 202.

In particular embodiments, vertically oriented slots 240, 242, 244, 246 that are generally perpendicular to the daughter board 204 are defined along inner surfaces 248, 250, 252, 254 of at least one of the forward wall 226, the intermediate wall 234 and the aft wall 228. In particular embodiments, the daughter board 204 at least partially seals the inner pocket 208. In one embodiment, the daughter board 204 at least partially seals the first and second inner pockets 236, 238.

In various embodiments, the electronic component 206 is electrically coupled to the daughter board 204 within the transmitter housing 202, particularly within the inner pocket 208 or first and second inner pockets 236, 238. For example, as shown in FIG. 4, the electronic component 206 may be electronically coupled via one or more connectors 256 that are coupled to the daughter board 204. In one embodiment, at least some of the circuit boards 210 are electronically coupled to the daughter board 204 via mating connectors 258 disposed along a bottom portion 260 of each circuit board 210.

In particular embodiments, a forward or first connector 262 is electronically coupled to the daughter board 204 proximate to a forward end portion 264 of the daughter board 204. In particular embodiments, a second or aft connector 266 is electronically coupled to the daughter board 204 proximate to an aft end portion 268 of the daughter board 204. In particular embodiments, the first and second connectors 262, 266 are electronically coupled to each other via one or more of the circuit boards 210 and/or the daughter board 204.

In particular embodiments, the electronic components 206 such as the circuit boards 210 may be configured to receive, process and transmit the various signals provided by the sensors 54 or other components that are coupled to the rotor shaft 12. For example, the electronic components 206 or circuit boards 210 may include various circuits, electronic components and or processors which are configured and/or programmed to receive analog signals from the sensors via the wires 58, the forward motherboard 108 and the first or forward connector 262, digitize and or compress the and/or otherwise process the signals and transmit the processed signals to the slip ring 62 via the second or aft connector 266.

Figure 5:
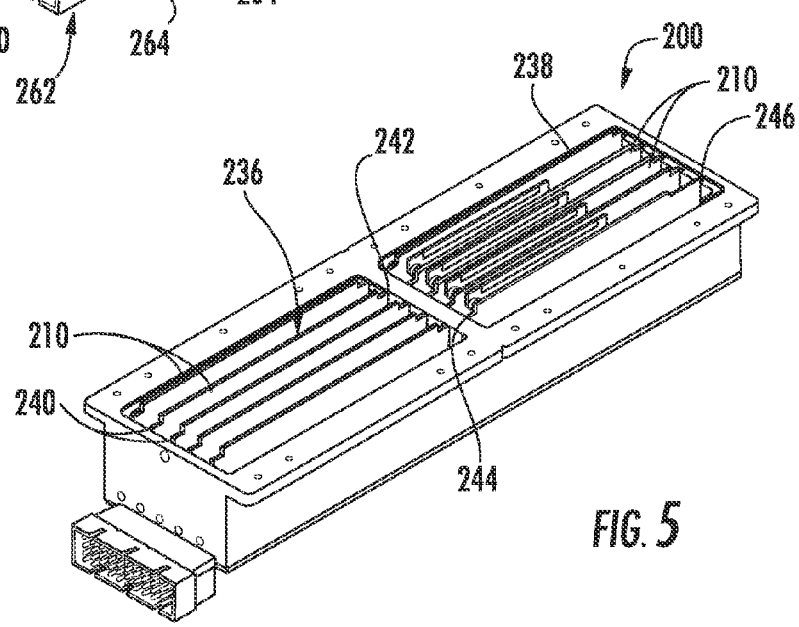
FIG. 5 is a perspective view of the transmitter assembly as shown in FIG. 4, according to at least one embodiment.

FIG. 5 provides a perspective view of the transmitter assembly 200 as shown in FIG. 4, according to at least one embodiment. In one embodiment, the plurality of circuit boards 210 is divided between the first and second inner pockets 236, 238. In various embodiments, as shown in FIG. 5, at least some of the circuit boards 210 of the plurality of circuit boards 210 are supported vertically via the slots 240, 242 or 244, 246. In this manner, the slots 240, 242 or 244, 246 restrict or reduce tangential g-loads on the circuit boards 210 during rotation of the rotor shaft 12 and/or the carrier shaft 102, thus maintaining the connection integrity between the circuit boards 210 and the daughter board 204.

Figure 6:
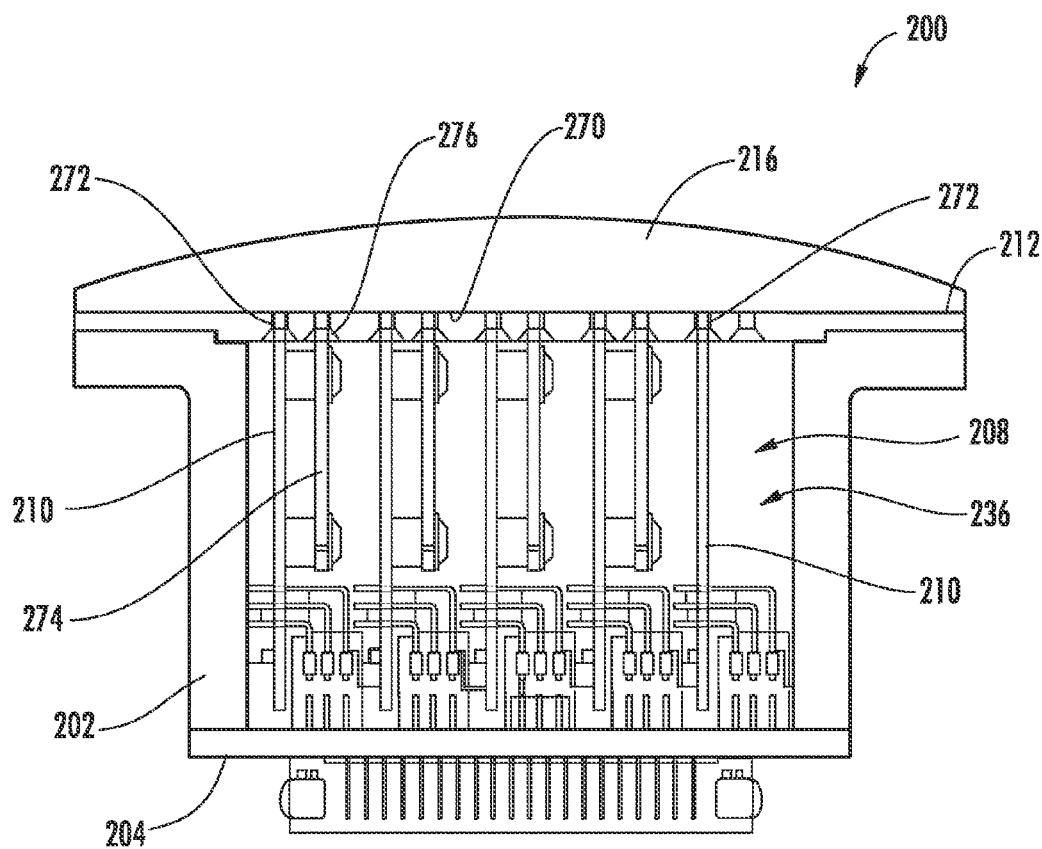
FIG. 6 is a cross sectional front view of an exemplary transmitter assembly in an assembled state, according to one or more embodiments of the present invention.

FIG. 6 provides a cross sectional front view of the transmitter assembly 200 in an assembled state, according to one or more embodiments of the present invention. FIG. 6 also provides a forward view of the second or aft connector 266. As shown in FIG. 6, the circuit boards 210 extend substantially perpendicular to the daughter board 204 towards an inner surface 270 the lid 216 of the transmitter assembly 200. In particular embodiments, a top portion 272 of the circuit boards 210 may be engaged against or in contact with the inner surface 270 of the lid 216. As a result, the lid 216 may restrict or reduce radial g-loads on the electronic components 206 such as the circuit boards 210 during rotation of the rotor shaft 12 and/or the carrier shaft 102, thus maintaining the connection integrity with the daughter board 204.

In particular embodiments, the top portion 272 of the circuit boards 210 may engage against or become in contact with the inner surface 270 of the lid 216 during rotation of the carrier shaft 102. As a result radially outward movement of the electronic components 206 or circuit boards 210 may be restricted during rotation of the rotor shaft 12 and/or the carrier shaft 102, thus maintaining the integrity of the connection with the daughter board 204.

In one embodiment, the partitioning plate 212 is disposed adjacent to and/or between the inner surface 270 of the lid 216 and the top portion 222 of the transmitter housing 202. In this embodiment, at least a portion of the top portion 272 of each circuit board 210 extends vertically at least partially through the partitioning plate 212 towards the inner surface 270 of the lid 216. In this manner, the partitioning plate 212 may restrict or reduce tangential g-loads on the circuit boards 210 during rotation of the rotor shaft 12 and/or the carrier shaft 102, thus maintaining the integrity of the connection with the daughter board 204.

In one embodiment, at least one circuit board 210 of the plurality of circuit boards 210 is electronically coupled to a slave circuit board 274 which extends substantially parallel to the corresponding circuit board 210. In particular embodiments, a top portion 276 of the slave circuit board 274 extends towards the inner surface 270 of the lid 216. In one embodiment, at least a portion of the top portion 276 of the slave circuit board 274 extends vertically at least partially through the partitioning plate 212 towards the inner surface 270 of the lid 216.

Figure 7:
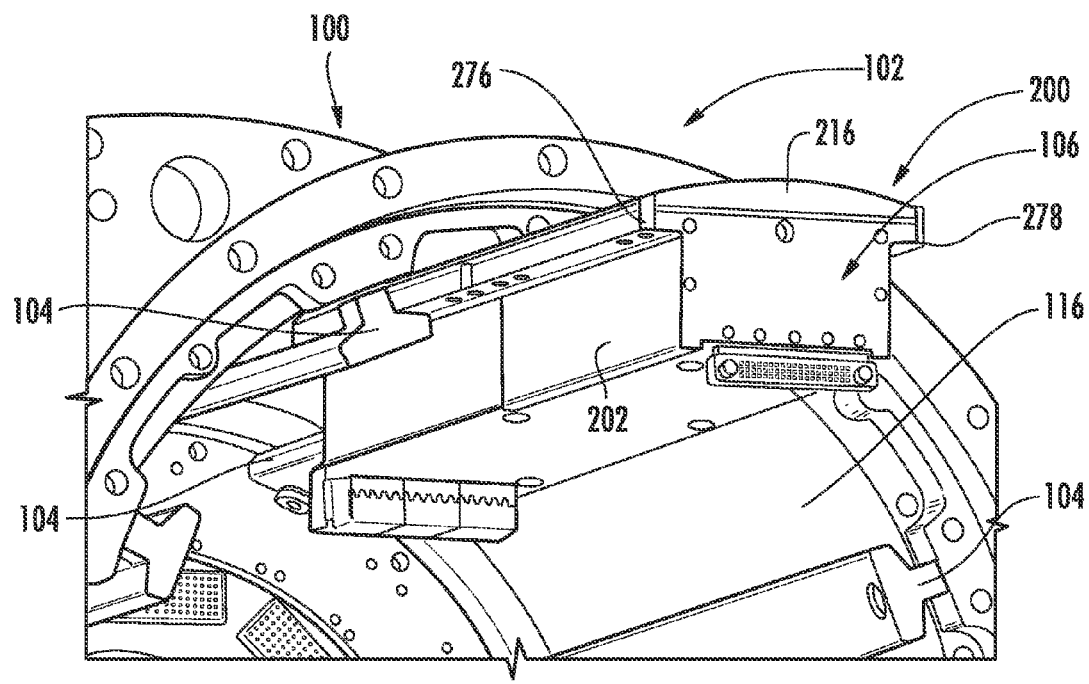
FIG. 7 is a partial perspective view of a portion of the system as shown in FIG. 2, according to one or more embodiments of the present invention.

FIG. 7 provides a partial perspective view of a portion of the system 100 including one transmitter assembly 106, 200 of the plurality of transmitter assemblies 106 partially inserted into the carrier shaft 102 according to one or more embodiments of the present invention. During assembly of the system 100, the transmitter assemblies 106, 200 may be inserted between two adjacent rail members 104 of the plurality of rail members 104.

In particular embodiments, the adjacent rail members 104 are circumferentially spaced apart with respect to a centerline of the carrier shaft 102. Each of the rail members 104 may be fixedly connected to and/or against an inner surface 116 of the carrier shaft 102. In particular embodiments, the transmitter housing 202 and/or the lid 216 may form guide or support rails 278, 280 which engage with the adjacent rail members 104. In various embodiments, the rail members 104 and/or the support rails 278, 280 radially support the transmitter assembly 106, 200 within the carrier shaft 102.

Figure 8:
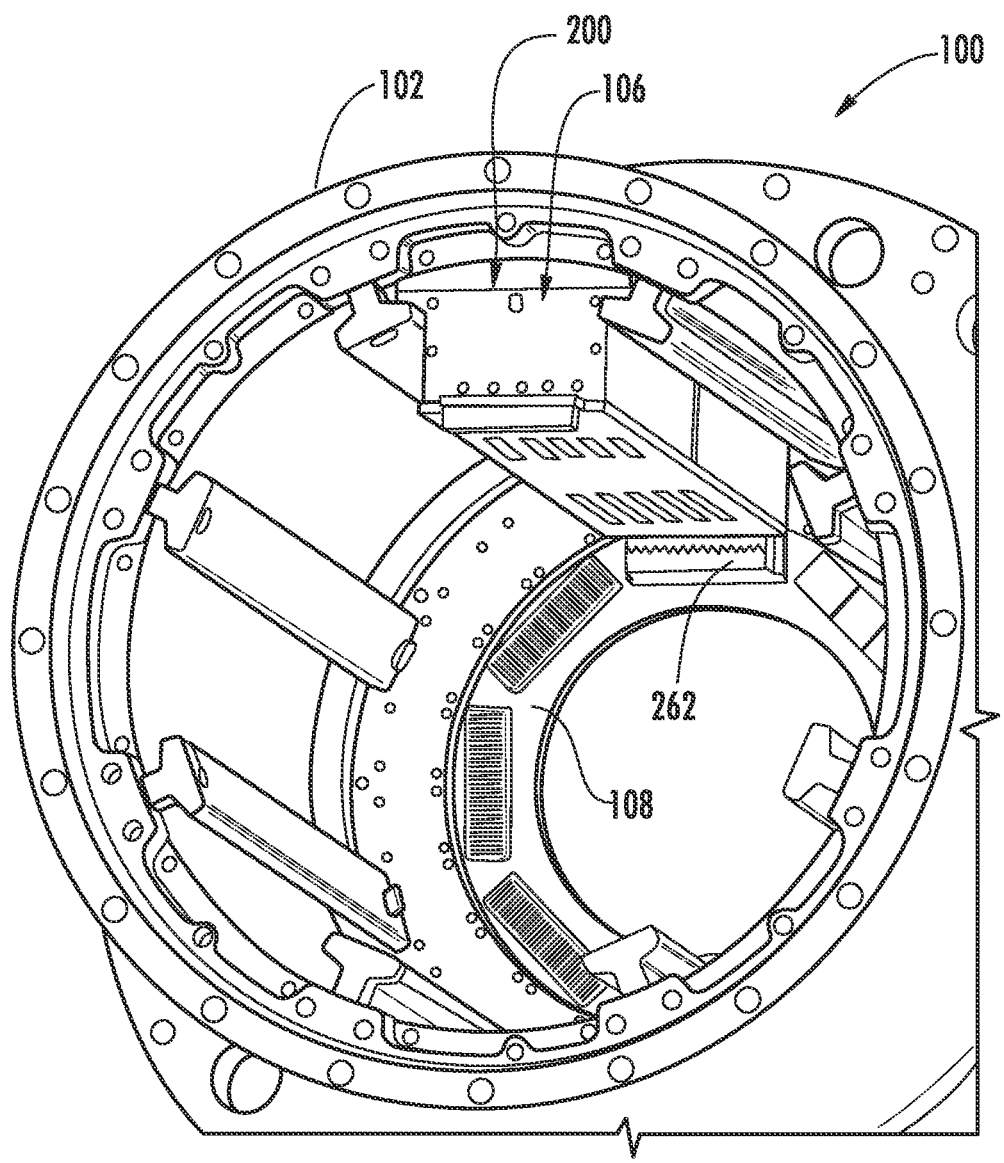
FIG. 8 is a perspective view of the system as shown in FIG. 7, with a transmitter assembly seated in position within a carrier shaft, according to at least one embodiment of the present invention.

FIG. 8 provides a perspective view of the system 100 as shown in FIG. 7, with the transmitter assembly 106, 200 as shown in FIG. 7 seated in position within the carrier shaft 102, according to at least one embodiment. In particular embodiments, as shown in FIG. 8, the first or forward connector 262 may be electronically coupled to the forward motherboard 108, for example, via a mating connector 118.

Figure 9:
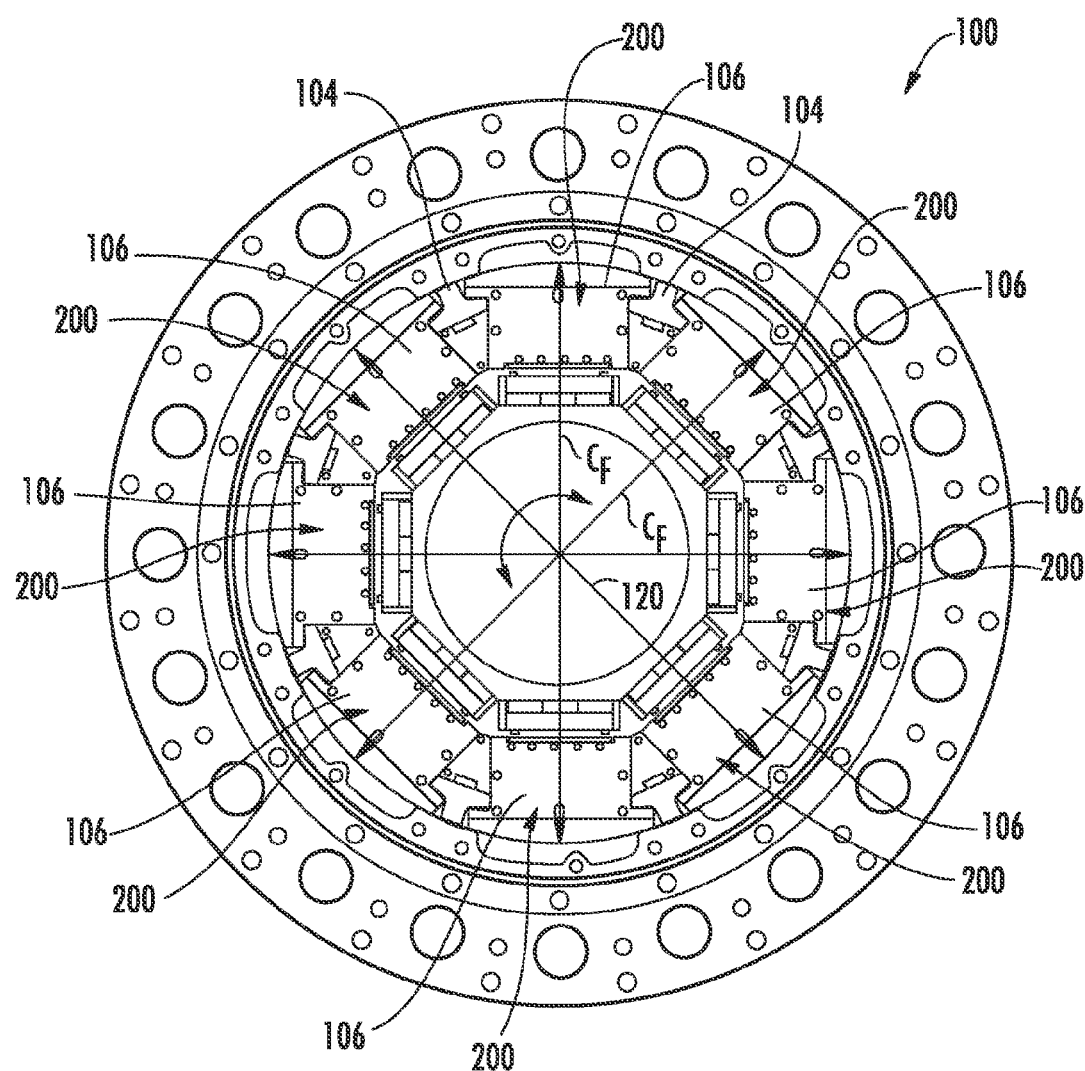
FIG. 9 is an aft view of the system as shown in FIG. 2 partially assembled, according to various embodiments of the present invention.

FIG. 9 provides an aft view of the system 100 partially assembled. As shown in FIG. 9, the plurality of transmitter assemblies 106, 200 are annularly arranged within the carrier shaft 102 with respect to an axial centerline 120 of the carrier shaft 102. Each transmitter assembly 106, 200 is radially supported via rail members 104 proximate to or against the inner surface of the carrier shaft 102. In particular embodiments, retaining plates 122 (FIG. 2) may be fixedly connected to the carrier shaft 102 so as to restrict or prevent axial movement of the transmitter assemblies 106, 200 within the carrier shaft 102.

As shown collectively in FIGS. 2-9, during rotation of the carrier shaft 102 centrifugal forces $C_F$ load each transmitter housing 202, particularly the lids 216, against the inner surface 116 of the carrier shaft 102. The slots 240, 242 or 244, 246 and/or the partitioning plate 212 electronic components 206 or circuit boards 210 restrict or reduce tangential movement of the electronic components 206 or circuit boards 210 during rotation of rotor shaft 12 and/or the carrier shaft 102, thus maintaining connection integrity between the circuit boards 210 and the daughter board 204. In addition or in the alternative, the inner surface 270 of the lid 216 restricts, reduces or prevents radially outward movement of the electronic components 206, circuit boards 210 and/or slave circuit boards 274 during rotation of the rotor shaft 12 and/or the carrier shaft 102, thus maintaining the connection integrity between the electronic components 206 or the circuit boards 210 and the daughter board 204.

The system 100 described and illustrated herein, provide various technical benefits over existing rotatable electronic component mounting configurations. For example, the transmitter assemblies 106, 200, particularly the transmitter housings 202 and lid 216 are constructed and/or arranged to support each electronic component 206 such as the circuit boards 210 axially, circumferentially, and radially during rotation of the rotor shaft 12 and/or the carrier shaft 102. Each transmitter assembly 106, 200 may be removed independently and can be interchanged with various other transmitter assemblies 106 having similar of different electronic components. In addition, the each transmitter assembly may be individually adjusted, for example, by adjusting individual rail members 104, to compensate for assembly tolerances. As a result, issues with connector alignment may be reduced or resolved. In addition or in the alternative, each transmitter assembly 106, 200 may be modified, for example, by adding weight, to assist in balancing the carrier shaft 102.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A system for packaging electronic components in a rotatable shaft, comprising:
   an annular carrier shaft having a first end axially spaced from a second end and an inner surface radially spaced from an outer surface; and
   a plurality of transmitter assemblies annularly arranged within the carrier shaft, each transmitter assembly having a transmitter housing radially supported within the carrier shaft via a pair of circumferentially spaced rail members, each transmitter assembly comprising:
      a daughter board which extends laterally and longitudinally across a bottom portion of the transmitter housing; and
      at least one electronic component electrically coupled to the daughter board, the electronic component extending substantially perpendicular to the daughter board within the transmitter housing;
      wherein the daughter board is electronically connected to a forward motherboard via a first connector and to an aft motherboard via a second connector.

2. The system as in claim 1, wherein the electronic component within at least one transmitter assembly of the plurality of transmitter assemblies includes a plurality of circuit boards disposed within an inner pocket of the corresponding transmitter housing, each circuit board being electronically connected to the daughter board, wherein each circuit board extends perpendicular to the daughter board towards a lid of the transmitter housing.

3. The system as in claim 2, wherein at least one circuit board of the plurality of circuit boards is supported via vertical slots defined within inner walls of the transmitter housing.

4. The system as in claim 2, wherein a top portion of at least one circuit board of the plurality of circuit boards extends at least partially through a partitioning plate, wherein the partitioning plate is disposed adjacent to an inner surface of the lid of the transmitter housing.

5. The system as in claim 2, wherein the transmitter housing of the at least one transmitter assembly of the plurality of transmitter assemblies comprises a forward wall, an intermediate wall, an aft wall and opposing side walls, wherein the forward, intermediate and side walls define a first inner pocket within the transmitter housing and the intermediate, aft and side walls define a second inner pocket within the transmitter housing.

6. The system as in claim 5, wherein at least one of the first and second inner pockets include at least one circuit board of the plurality of circuit boards.

7. The system as in claim 2, wherein the top portion of at least one circuit board of the plurality of circuit boards engages with the inner surface of the lid during rotation of the carrier shaft.

8. The system as in claim 7, wherein at least one circuit board of the plurality of circuit boards is electronically coupled to a slave circuit board which extends parallel to the at least one circuit board, wherein a top portion of the slave circuit board engages with the inner surface of the lid during rotation of the carrier shaft.

9. The system as in claim 1, wherein at least one transmitter assembly of the plurality of transmitter assemblies further comprises a shim disposed between a top portion of the circuit boards and an inner surface of the lid of the transmitter housing.

10. The system as in claim 1, wherein a lid of the transmitter housing loads against the inner surface of the carrier shaft during rotation of the carrier shaft.

* * * * *